United States Patent
Moravek et al.

(12)

(10) Patent No.: US 6,805,906 B2
(45) Date of Patent: Oct. 19, 2004

(54) METHOD OF APPLICATION OF A PROTECTIVE COATING TO A SUBSTRATE

(75) Inventors: Vladimir Moravek, Waterdown (CA); Paul Lowden, Cambridge (CA); Joseph Liburdi, Ontario (CA)

(73) Assignee: Liburdi Engineering Limited, Ontario (CA)

( * ) Notice: Subject to any disclaimer, the term of this patent is extended or adjusted under 35 U.S.C. 154(b) by 8 days.

(21) Appl. No.: 10/092,802

(22) Filed: Mar. 8, 2002

(65) Prior Publication Data

US 2002/0128376 A1 Sep. 12, 2002

Related U.S. Application Data

(60) Provisional application No. 60/273,953, filed on Mar. 8, 2001.

(51) Int. Cl.$^7$ .............................. B05D 3/02; B05D 7/14
(52) U.S. Cl. .................. 427/229; 427/226; 427/327; 427/350; 427/374.4; 427/376.6; 427/377; 427/380; 427/387; 427/388.1
(58) Field of Search ................................ 427/295, 387, 427/388.1, 376.6, 380, 377, 350, 374.4, 226, 229, 327

(56) References Cited

U.S. PATENT DOCUMENTS

| | | | |
|---|---|---|---|
| 3,102,044 A | 8/1963 | Joseph | 117/22 |
| 3,248,251 A | 4/1966 | Allen | 105/286 |
| 4,310,574 A | 1/1982 | Deadmore et al. | 427/405 |
| 4,311,623 A | * | 1/1982 | Supcoe | 524/310 |
| 6,171,704 B1 | * | 1/2001 | Mosser et al. | 428/450 |

FOREIGN PATENT DOCUMENTS

| | | |
|---|---|---|
| EP | 0 984 074 | 3/2000 |

OTHER PUBLICATIONS

International Search Report for PCT/CA02/00330 (Forms PCT/ISA/210 and PCT/ISA/220) Jul. 2002.

* cited by examiner

*Primary Examiner*—Kirsten C. Jolley
(74) *Attorney, Agent, or Firm*—Smith, Gambrell & Russell, LLP

(57) ABSTRACT

A process of coating a refractory turbine part with a protective coating which is ultimately diffusion bonded to the part. A slurry coating material is prepared from a mixture of a silicon alkyd paint and suspended particles of an aluminum or aluminum alloy powder. Parts may be dipped in the slurry and subsequently be heat treated in selected atmospheres and temperatures to diffuse the coating into the surface of the part.

8 Claims, No Drawings

METHOD OF APPLICATION OF A PROTECTIVE COATING TO A SUBSTRATE

This application claims priority under 35 U.S.C. § 119(e) for Provisional Patent Application No. 60/273,953, filed Mar. 8, 2001 hereby incorporated by reference.

FIELD OF INVENTION

This application is directed to a method of coating articles such as superalloy turbine parts with a protective coating which may contain several elements, but will generally contain a significant percentage of aluminum.

BACKGROUND OF THE INVENTION

The life of gas turbine parts which are subjected to the passage of the hot gas stream can be extended by bonding a coating of an oxidation resistant material such as an aluminide material to the surface of the part. Considerable research effort has been directed to the selection of the oxidation resistant material and the process for application of the material. This has resulted in the evolution of gas turbine blades which now have a life in the order of thousands of hours (when coated) compared to a life of only a few hundred hours if the same blades were operated in the hot gas stream in an uncoated condition.

Gas turbine parts which are subjected to the passage of the hot gas stream are required to operate in a hostile environment. Not only must these parts, typically turbine blades and vanes, withstand the intense heat produced in the hot gas stream, but both turbines and vanes are required to deflect the hot gas stream to enable the turbine engine to extract energy from the hot gas stream.

Turbine blades are also subjected to substantial centrifugal forces during operation; the coating must not migrate, peel or crack in the presence of any of the above forces during operation of the turbine.

The hot turbine parts are also subjected to the passage of a hot gas stream which usually contains corrosive materials such as sodium, potassium, sulphur and vanadium which may be present in the turbine fuel. Sometimes the turbine may ingest other substances in the intake air such as seawater salt which when heated can become very corrosive.

Similarly the atmosphere contains particles of dust and other foreign particles which when ingested in the turbine and accelerated in the hot gas stream tend to "sand blast" the surfaces of the turbine blades and vanes to erode the surface thereof.

In addition to the above forces, each turbine blade is subjected to pulsations in pressure during turbine operation which cause deflections and vibrations in the blade which the coating must also endure without peeling, spalling or cracking during the lifetime of the blade.

In the past, turbine parts which must operate in the hot gas stream have been successfully coated with selected metals or metal oxides applied to the surface of the superalloy by various techniques which have evolved over the past forty years. Some methods of coating involve vapour deposition; others utilize a pack cementation process; still others use a slurry deposition process in which a carrier in which particles of selected metals are held in suspension so that the mixture of carrier and metallic particles may be applied to a substrate to form a coating on the substrate.

In a slurry process a powder composed of selected metallic particles is typically suspended in a carrier which performs the function of a fugitive binder, and which carrier functions to carry the suspended metallic particles to the cleaned surface of the substrate to be coated. If the selection of components of the mixture is done correctly, the carrier and suspended particles will form a uniform coating on the surface of the substrate and the carrier will temporarily bind the particles of the metallic material to the surface of the substrate (see U.S. Pat. No. 3,102,044 for example). The carrier is then driven off by some means, usually by heating the substrate to a predetermined temperature. If necessary, the coated substrate may then be subjected to additional heat treatment procedures to bond a continuous uninterrupted coating of a protective material to (the surface of) the substrate.

The carrier for the metallic or metallic oxide particles must be capable of keeping the metallic or metallic oxides in suspension during the deposition process so that a continuous, uniform coating of the metallic or metallic oxide materials results. It is important that the coating process may be controlled so that a uniform coating is deposited on the substrate and under no circumstances will any eventual blistering, cracking, peeling or spalling of the coating occur during heat treatment or during subsequent use.

In addition, the coating comprising the carrier and the selected particles suspended therein should be capable of being applied locally to a previously coated substrate to "repair" places during the application process where the previously applied coating has been applied too sparingly, or the coating on the surface has been impact damaged before heat treating of the coated substrate has begun.

Because the carrier for the selected particles which will ultimately become the coating is usually of a somewhat volatile nature, it must be environmentally acceptable in order to be used with this process in safety.

U.S. Pat. No. 3,102,044 Aug. 27, 1963 Joseph

This is one of the earlier coating patents, which describes a process of application of a coating mixture comprising particles of a metal or metal oxides suspended in a carrier to turbine parts.

The selected particles are suspended in a suitable dispersant which may be alcohols, esters and ketones. The carrier is evaporated by some means and the coated article is subjected to a heat treatment operation to diffuse and permanently fix the metallic dust or powder to the substrate.

U.S. Pat. No. 3,248,251 Apr. 26, 1966 Allen

This patent describes a process for coating substrates such as turbine blades with solid particulate materials such as aluminum powder carried in a phosphates/chromates/metal ion solution. The powder-carrier mixture may be applied by spraying, dipping, rolling or brushing to/on the surface of the substrate to be coated.

The coating may be then heat cured and processed to form a protective coating for the substrate.

U.S. Pat. No. 4,310,574

A lacquer slurry comprising cellulose nitrate carrying silicon powder is deposited on a substrate. The slurry was dried on the substrate and the coated substrate was placed on an aluminum powder pack and heated to 1100° C. to produce an aluminized coating.

SUMMARY OF THE INVENTION

Articles such as turbine vanes and blades are cleaned in preparation for coating as in most of the prior art procedures. A slurry is prepared which comprises a carrier of silicone alkyd paint in which an aluminum (or an aluminum alloy) powder (in this instance Amdry 355) is mixed in the paint in a predetermined ratio ranging from 10 to 80% by weight.

Additions of other elemental powders ranging from 0–15% of the mixture may also be added to alter the composition of the finished diffusion coating.

After the slurry is mixed and degassed, the viscosity is checked and if the viscosity is suitable, parts to be coated are dipped in the slurry. Parts are allowed to "drip off" from selected edges or points of the dipped parts and the coating is allowed to cure for at least 60 minutes.

The coated parts may be placed in a suitable oven at a temperature less than 100° C. to drive off the solvent materials of the carrier.

The process is completed by subjecting the partially treated coated parts to treatment at high temperature in a vacuum or inert gas atmosphere. At temperature, a reaction with the substrate to form a metal aluminum compound on the surface of the substrate occurs.

DESCRIPTION OF THE INVENTION

Many patents have issued relating to the production of diffused aluminum coatings for metallic turbine parts which are subjected to high temperature operation in hostile environments. Turbine blades and vanes composed of alloys of chromium, cobalt, molybdenum, aluminum, nickel and traces of other elements usually referred to as "SUPERALLOYS" typically operate in such an environment.

It has been found that the working life of such parts may be drastically extended by the presence of a protective coating formed on and diffused into the superalloy. The process of forming such a coating on the superalloy has been the subject of many patents and technical papers.

This application describes a very simple method of providing an aluminum based coating on a substrate such as a SUPERALLOY by means of applying a coating to the SUPERALLOY part at room temperature and atmospheric pressure without the use of complicated cementation heat pack processes or vapor deposition processes.

Parts to be coated (in this instance, turbine blades) are cleaned by sand blasting (i.e. sand blasting with grit 240).

A slurry is prepared as follows: 50 parts of 12 SiAl powder (Amdry 355, fine powder preferably −350 mesh) Id #3550 is mixed into 50 parts of a carrier (1:1 mass ratio).

The preferred carrier is a commercially available paint manufactured by Benjamin-Moore and is available under designation M66-79 silicone alkyd high heat aluminum paint.

The powdered silicon aluminum mixture is slowly added to the M66-79 paint while mixing continues.

The mixture is repeatedly evacuated to −10 psig for several seconds to remove entrapped air (requires 3–4 applications at about 15–20 seconds per application).

Mixing of the paint and powder continues for 30–50 minutes. At this time, no entrapped air should be found in the mixture.

Mixing continues until no air bubbles or agglomerates are present in the mixture (generally requires 2 hours).

Filter the thoroughly mixed slurry through a 0.5 mm mesh screen.

Coating

Dip the partially coated article in the coating mixture for enough time to allow the coating to wet the surface of the part to be coated. Remove the dipped part from the coating mixture.

Allow the excess of the slurry coating to drip from a preselected "drip point" on the coated part.

Allow the coated part to "air cure" for about one hour at room temperature.

At this time, the coated part may be inspected for coating thickness, coating integrity etc. and repairs to the coating by brushing etc. may be done before heat curing and coating diffusion are done.

Diffusion

The "green" coated articles are next placed in a furnace where the pressure is dropped to less than 1 mm Hg and held at this level for about ½ hour (at room temperature).

The furnace is now filled with Argon at room temperature and pressure.

Heat treatment begins with a temperature ramp of 20° C. per minute to about 840° C. while a slow flow of argon gas passes through the furnace to partially form a diffused coating. This temperature is maintained constant for about ½ hour. Allow coated articles to cool to about 100° C. Inspect coated surfaces of articles.

Place the previously treated articles in a high temperature vacuum furnace. Draw a vacuum and heat tie coated parts at a rate of 10° C./minute to 1080° C. Hold this temperature for about ½ hour. Air quench the heated parts.

The result will be a SUPERALLOY part having a protective silicon containing aluminide coating diffused into its surface. The coating displays all the characteristics of prior art aluminide coatings, that is, enhanced oxidation, corrosion and erosion resistance as well as resistance to cracking, peeling and spalling, etc.

The coating technique is simplistic in nature and relatively inexpensive to apply. No exotic vapor deposition, pack cementation or slurry steps are required. Relatively unskilled personnel are able to perform the steps required to obtain a suitably coated part.

Control of the coating process is rather straightforward and relatively easy to maintain.

Coating equipment is not of the exotic nature as found in some prior art schemes.

The coating process tends to be forgiving in that areas which for some reason or other are not covered satisfactorily, may be repaired prior to heat treating by hand brush coating.

The M66-79 silicone alkyd aluminum paint is the preferred carrier for this process. The paint has excellent "leveling" qualities and the paint cures so that when the cured coating is heated to diffuse the aluminum particulate material into the substrate, no bubbling or cracking of the coating occurs. Although other carriers have been tried, the M66-79 high heat aluminum paint is the preferred carrier.

The previous example illustrates the use of aluminum silicon alloy powders as a basic constituent of the slurry coating. It may be at times advantageous to employ pure aluminum powders or aluminum alloy powders containing other elements known to improve the oxidation resistant behavior of high temperature coatings such as chromium, yttrium, hafnium, rhenium, platinum or palladium, etc.

Similarly, additions of powders of these elements can be made directly to the slurry mixture.

Although other alternatives will be apparent to those skilled in the art, the applicants prefer to limit the scope of this invention to the ambit of the following claims.

What is claimed is:

1. A process of coating a turbine part which is subjected to high temperature operation during its life comprising:

cleaning a surface of the part;

coating said cleaned surface of said part with a slurry containing finely divided aluminum and/or aluminum alloy particles, the particles having a particle size of about −350 mesh;

said slurry having a carrier of a silicone alkyd high heat aluminum paint, the mass ratio of paint to powder being about 1:1;

allowing the surface of said part coated with said slurry to air cure; and heat treating the air-cured coated surface of said part to partially form a diffused coating on said surface of said part in the presence of an inert gas at about 840° C.

2. A process as claimed in claim 1 wherein the partially treated part is heat treated in a vacuum furnace for a predetermined time to diffuse-bond the coating to the turbine part at a temperature of about 1080° C.

3. A process as claimed in claim 2 wherein the part is air cooled.

4. A process of coating a turbine part which is subjected to high temperature operation during its life comprising:

cleaning a surface of the part according to known techniques, coating said cleaned surface of said part with a slurry containing finely divided aluminum and/or aluminum alloy particles, said slurry having a carrier of a commercially available silicone alkyd paint;

allowing the surface of said part coated with said slurry to air cure sufficiently;

heat treating the air-cured coated surface of said part to partially form a diffused coating on said surface of said part in the presence of an inert gas at about 840° C.; and heat treating in a vacuum furnace the partially treated surface of said part for a predetermined time to diffuse-bond the coating to said surface of said part at a temperature of about 1080° C.

5. A process as claimed in claim 4 in which said coating contains other elements or elemental alloying powders to improve the oxidation resistance of said coating.

6. A process as claimed in claim 4 wherein said particles have a particle size of about −350 mesh and the carrier is a silicone alkyd high heat aluminum paint.

7. A process as claimed in claim 4 wherein the mass ratio of paint to powder is about 1:1.

8. A process as claimed in claim 4, wherein after the heat treating in the vacuum furnace of the partially treated surface of said part for a predetermined time to diffuse-bond the coating to said surface of said part at a temperature of about 1080° C., the part is air cooled.

* * * * *